United States Patent [19]

McChesney et al.

[11] Patent Number: 4,783,845

[45] Date of Patent: Nov. 8, 1988

[54] DIGITAL TONE SQUELCH DETECTOR

[75] Inventors: James R. McChesney; Michael W. Cook, both of Fort Wayne, Ind.

[73] Assignee: ITT Aerospace Optical, Fort Wayne, Ind.

[21] Appl. No.: 811,926

[22] Filed: Dec. 20, 1985

[51] Int. Cl.⁴ .......... H04Q 7/00; H04B 1/00

[52] U.S. Cl. .......... 455/35; 455/221; 375/104; 340/825.48

[58] Field of Search .......... 455/35, 36, 221, 212; 375/104; 340/825.48

[56] References Cited

U.S. PATENT DOCUMENTS 4,001,521 1/1977 Fukata et al. .
4,021,653 5/1977 Sharp et al. .......... 455/35
4,025,730 5/1977 Sawai .
4,114,142 9/1978 Wycoff et al. .......... 455/36
4,143,325 3/1979 Kahn .......... 455/221
4,245,325 1/1981 Kikuchi et al. .
4,288,664 9/1981 Araseki .
4,388,731 6/1983 King .......... 455/221
4,414,689 11/1983 Enderson .......... 455/221
4,484,355 11/1984 Henke et al. .......... 455/35
4,627,102 12/1986 Nott .......... 455/221
4,646,358 2/1987 Shanley .......... 455/35

FOREIGN PATENT DOCUMENTS 1482629 8/1977 United Kingdom .
1501562 2/1978 United Kingdom .
1518006 7/1978 United Kingdom .
1524019 9/1978 United Kingdom .
2029588 3/1980 United Kingdom .
1566164 4/1980 United Kingdom .
2049360 12/1980 United Kingdom .

*Primary Examiner*—Robert L. Griffin
*Assistant Examiner*—Curtis Kuntz
*Attorney, Agent, or Firm*—Robert A. Walsh; Thomas N. Twomey; Mary C. Werner

[57] ABSTRACT

A digital tone squelch detect circuit functions to give an enabling signal for audio transmission in an FM radio network. The circuit comprises an analog to digital converter which outputs a binary coded signal representative of the voltage level of a received audio tone signal. The binary signal is then placed into a shift register which periodically is rotated and multiplied by a reference clock signal for correlation with a stored replica of the tone. The output of the correlator, which is representative of the degree of correlation, is fed to an accumulator which integrates it and sends it to a comparator where its binary valve is compared to an arbitrary threshold binary value by a hysteresis network. After detection the hysteresis established circuit outputs a tone detect signal and lowers the detection threshold so as to maintain the tone detect signal during periods of signal fadeout. However, if no signal is detected for several cycles, the threshold is raised to the previous binary level so as to avoid triggering on noise.

2 Claims, 2 Drawing Sheets

TABLE I: DIGITAL SQUELCH TONE DETECT TEST RESULTS

| 1KHZ DEV. | 150 HZ DEV. | RCV RF | 1KHZ SINAD | ATTACK TIME | RELEASE TIME | FALSE DET. | HYSTERISIS | | CHATTER | PROB. TONE DET. WITHIN 40m SEC. |
|---|---|---|---|---|---|---|---|---|---|---|
| | | | | | | | DET. RF LEVEL | REL. RF LEVEL | | |
| ±6.5KHZ ↓ | ±3KHZ | -121dbm | 10db | 30m SEC. | 40→60m SEC. | 1 PER 5 MIN ↓ | -126 dbm | -129 dbm | YES | 99.9 % |
| | ±1.6KHZ | -121dbm | 12db | 25→60m SEC. | 40→60m SEC. | | -124 dbm | -126 dbm | YES | ~90% |
| | ±1.25KHZ | -121dbm | 12db | 25→100m SEC. | 40→60m SEC. | | -123 dbm | -125 dbm | YES | ~75% |

STANAG SQUELCH TONE REQUIREMENTS

DEVIATION = ± 1600 Hz ± 350 Hz
ATTACK TIME ≤ 40 m SEC.
RELEASE TIME ≤ 60 m SEC.
SENSITIVITY TIME : NOT SPECIFIED

SINCGARS SQUELCH TONE REQUIREMENTS

DEVIATION = 3000 Hz ± 300 Hz
ATTACK TIME ≤ 40 m SEC.
RELEASE TIME ≤ 40 m SEC.
HYSTERISIS = 3 db
SENSITIVITY ≤ 10 db SINAD

Fig. 2

DIGITAL TONE SQUELCH DETECTOR

This invention was made with Government support under Contract No. DAAB07-78-C-0150 awarded by the Department of the Army. The Government has certain rights in this invention.

BACKGROUND OF THE INVENTION

The invention relates to a digital tone squelch detect circuit for a radio network.

Squelch circuits for automatically quieting a receiver by reducing its gain in response to a specified characteristic of the input are well known in the art. With regard to frequency modulation mobile communication receivers such as are discussed herein, the term squelch clamping is used to describe the characteristic of the receiver, when receiving a normal signal, in which the squelch circuit under certain conditions of modulation will cause suppression of the audio output.

SUMMARY OF THE INVENTION

It is an object of the present invention to provide a digital tone squelch detect circuit wherein verified reception of the tone signal is used as an enabling signal to initiate audio reception in an FM radio network. This and other objects of the invention are achieved by providing a circuit comprising a tone transmitter, carrier keying module, FM transmitter and modulator, FM demodulator, lowpass filter, analog to digital converter, shift register, correlator, hysteresis network and comparator. The detection circuit operates by lowpass filtering the received tone signals and feeding it to a 3 bit A/D converter which in turn feeds a 64×3 bit digital shift register. At an appropriate time, the entire content of the shift register is rotated and the output of the shift register is multiplied by a reference clock. This action correlates the contents of the shift register against a stored replica of the tone system. The output of the correlator is fed to an accumulator. When the received contents of the shift register are in phase with the reference signal, the accumulator integrates to a binary value which is compared against a binary threshold generated by a hysteresis circuit to provide for detection of the tone signal.

After detection of the tone signal, the threshold value to the magnitude comparator is lowered to a lesser binary value to provide detection hysteresis. The hysteresis circuit outputs a tone detect signal upon detection of the first correlation pulse. If a correlation pulse is missed for four consecutive cycles, the hysteresis circuit returns the binary threshold of detection to the earlier higher value.

BRIEF DESCRIPTION OF THE DRAWINGS

FIG. 2 is a chart showing the performance of the present invention as compared to established standards.

DESCRIPTION OF THE PREFERRED EMBODIMENT

Figure 1:
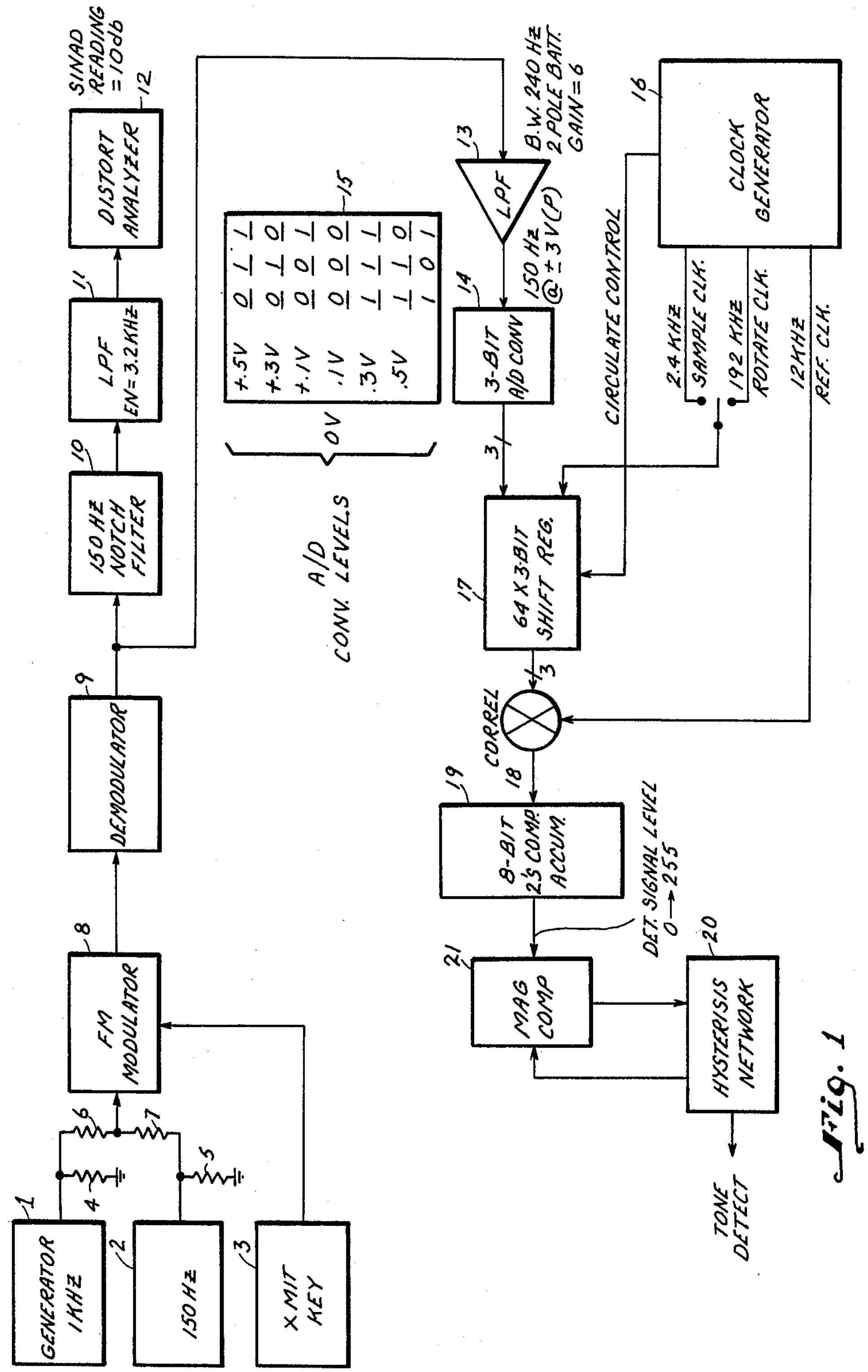
FIG. 1 is a schematic drawing of the circuit of the present invention.

FIG. 1 shows a generator 1 which outputs a signal of one kilohertz, representative of speech, through the resistor combination 4 and 6 into the FM modulator 8. Wavetek model 182A may be used for generator 1, and Hewlett Packard model 8640 may be used for FM modulator 8. The one kilohertz signal is used to modulate an FM carrier wave and is transmitted through the air until it is received at demodulator 9. Demodulator 9 may be a circuit module specifically designed for a certain radio network, such as the SINCGARS radio network developed for the U.S. Army.

The demodulated one kilohertz signal passes through a 15 hertz notch filter 10 and then through the low pass filter 11 before arriving at distort analyser 12. The distort analyser used can be a Hewlett Packard model 334A. For operation of the squelch tone circuit the RF level with adjusted down to minus 121 dBm until a 10 db SINAD reading on the one kilohertz test tone is achieved.

Tone generator 2 transmits a 150 hertz signal through resistors 5 and 7, which respectively are sized the same as resistors 4 and 6, into FM modulator 8. Once the 10 dB reading on the distort analyser 12 has been achieved, transmitter keying modulator 3 is used to pulse the FM carrier on and off and at that time the attack/release times can be measured. The attack time is defined as the time from the application of the FM frequency until the tone is detected in the receiver. The release time is defined as the time from when the radio frequency is cutoff by module 3 until an absence of the 150 hertz tone is detected. FIG. 2 provides a table of values obtained for attack time and release time.

After passing through the modulator 8 and demodulator 9 the 150 hertz tone is conveyed to a low pass filter 13. The low pass filter has a bandwidth of 240 hertz and can be a 2 pole Butterworth type with a gain of 6. The signal is then fed to a 3 bit analog/digital converter 14. The analog to digital conversion levels of the converter 14 are shown in table 15. Converter 14 in turn feeds a 64×3 bit digital shift register 17. As a result, four cycles of the 150 hertz tone may be stored in shift register 17. At the end of each 2.4 kilohertz clock signal received from clock generator 16, the entire content of shift register 17 is rotated by 192 kilohertz clock pulses from clock 16 and the output of the register is multiplied by a 12 kilohertz reference clock signal from clock generator 16. Since the ratio of 12 kilohertz to 150 hertz is the same as 192 kilohertz to 2.4 kilohertz, correlator 18 effectively correlates shift register 17 against a stored replica of the 150 hertz tone. The output of correlator/-multiplier 18 is fed to an 8 bit plus sign two's complement accumulator 19. When the received contents of the shift register 17 are in phase with the 12 kilohertz reference signal from clock generator 16, the accumulator 19 integrates to a maximum nominal binary value of +144. The actual correlation value is compared in comparator 21 against a binary threshold of +144 sent from hysteresis network 20 to comparator 21 to provide for detection of the 150 hertz squelch tone. A signal indicating tone detection is supplied from hysteresis network 20 as an enablement for audio transmission to begin.

After detection of the 150 hertz tone, hysteresis network 20 provides a lower threshold value of +80 to magnitude comparator 21. The lower value enables the tone signal to be detected during periods of momentary fadeout. However, if the hysteresis network 20 does not generate a correlation pulse for four consecutive cycles of the 150 hertz tone or approximately 26 milliseconds, hysteresis network 20 returns the threshold of detection to plus 144. Thus the probability of triggering on noise during absence of the tone signal is lessened.

FIG. 2 (Table 1) shows the performance of the circuit of the invention as juxtaposed with standards of the SINCGARS and STANAG radio systems. It can be noted therein that the circuit meets the requirements for deviation, and attack and release times for both the STANAG and SINCGARS radio networks, and also meets the SINCGARS squelch tone requirements for hysteresis and sensitivity.

For a transmitted signal having a 6.5 kHz FM signal modulated with a 1 KHz signal representative of speech, and a 150 Hz tone with the deviations shown for three tests, the attack and release times are shown as well as the detectable RF level and the RF level at which release occurs. Additionally shown are the SQUELCH TONE REQUIREMENTS for two standards which are satisfied by the implementation of the invention disclosed herein.

We claim:

1. A digital tone squelch circuit comprising:

means for converting a first received analog signal to a first digital signal based on the amplitude of the first received analog signal;

means for correlating said first digital signal with a stored signal proportional to said first digital signal to generate a second digital signal based on the correlation between said first digital signal and said stored signal;

comparator means for comparing said second digital signal with a threshold signal whereby the presence of said first analog signal can be established;

a shift register connected to receive an output from said means for converting and provide an input to said means for correlating; and a clock generator connected to said shift register to rotate the contents of said shift register with a signal of a first frequency and also connected to said means for correlating with a signal of such a second frequency that the signal from said shift register to said means for correlating is effectively compared against a stored replica of said first received analog signal.

2. A digital tone squelch circuit comprising:

means for converting a first received analog signal to a first digital signal based on the amplitude of the first received analog signal;

means for correlating said first digital signal with a stored signal proportional to said first digital signal to generate a second digital signal based on the correlation between said first digital signal and said stored signal;

comparator means for comparing said second digital signal with a threshold signal whereby the presence of said first analog signal can be established;

a shift register connected to receive an output from said means for converting and provide an input to said means for correlating;

said means for converting a first received analog signal to a first digital signal produces a 3 bit digital signal;

wherein said shift register is 64×3 bit digital shift register and an output signal from said shift register is multiplied by a signal from a reference clock upon rotation of said shift register to provide a first correlator input signal to a first input of said means for correlating; and said reference clock provides a second correlator input signal to a second input of said means for correlating whereupon said means for correlating provides at an output thereof said second digital signal.

* * * * *